US012717853B1

(12) United States Patent
Lau et al.

(10) Patent No.: US 12,717,853 B1
(45) Date of Patent: Aug. 25, 2026

(54) SYNCING DIGITAL CONTENT FROM EXTERNAL APPLICATIONS BY UTILIZING FEDERATED CONNECTIONS ASSOCIATED WITH USER ACCOUNTS

(71) Applicant: Dropbox, Inc., San Francisco, CA (US)

(72) Inventors: Kevin Lau, New York, NY (US); Daniel Tchorni, Regina (CA); Andrew Viteri, Chicago, IL (US)

(73) Assignee: Dropbox, Inc., San Francisco, CA (US)

( * ) Notice: Subject to any disclaimer, the term of this patent is extended or adjusted under 35 U.S.C. 154(b) by 0 days.

(21) Appl. No.: 19/306,192

(22) Filed: Aug. 21, 2025

(51) Int. Cl.
*G06F 16/00* (2019.01)
*G06F 16/25* (2019.01)
*G06F 16/27* (2019.01)
*G06F 16/901* (2019.01)
*G06F 16/951* (2019.01)

(52) U.S. Cl.
CPC .......... *G06F 16/951* (2019.01); *G06F 16/256* (2019.01); *G06F 16/27* (2019.01); *G06F 16/9024* (2019.01)

(58) Field of Classification Search
CPC ...... G06F 16/951; G06F 16/256; G06F 16/27; G06F 16/9024
See application file for complete search history.

(56) References Cited

U.S. PATENT DOCUMENTS 7,577,691 B2 8/2009 Novik et al.
8,429,110 B2 4/2013 Cai et al.
9,449,016 B2 9/2016 Schadt et al.
10,019,460 B2 7/2018 Benton et al.
10,440,106 B2 10/2019 Murstein et al.
2013/0219456 A1* 8/2013 Sharma ................. H04L 9/0894 726/1
2014/0229438 A1 8/2014 Carriero et al.
2015/0248435 A1* 9/2015 Solheim ................ G06F 9/5072 707/610
2018/0060523 A1* 3/2018 Farh ...................... G06F 16/256
2018/0336277 A1* 11/2018 Alsina ................. G06F 16/9024
2019/0065597 A1* 2/2019 Murray .................. G06N 20/00
2019/0205425 A1 7/2019 Goldberg et al.
2020/0004841 A1 1/2020 Tyebkhan et al.
2020/0014750 A1 1/2020 Murstein et al.
2020/0128073 A1 4/2020 Savage et al.

* cited by examiner

*Primary Examiner* — Paul Kim
(74) *Attorney, Agent, or Firm* — Keller Preece PLLC

(57) ABSTRACT

The present disclosure relates to systems, non-transitory computer-readable media, and methods for retrieving digital content from external applications through a software connection. In some embodiments, the disclosed systems identify a software connector comprising a plurality of federated connections linking a content management system and an external application, the plurality of federated connections associated with respective user accounts of the content management system and connecting the respective user accounts to the external application through the software connector. The disclosed systems, use a sync engine to crawl the plurality of federated connections and generate a content graph comprising nodes representing digital content from the external application to sync with the content management system. The disclosed systems request, by the sync engine using the content graph, the digital content from the external application to the content management system through the software connector.

20 Claims, 12 Drawing Sheets

SYNCING DIGITAL CONTENT FROM EXTERNAL APPLICATIONS BY UTILIZING FEDERATED CONNECTIONS ASSOCIATED WITH USER ACCOUNTS

BACKGROUND

Advancements in computing devices and networking technology have given rise to a variety of innovations in sharing digital content across various applications and storage locations. For example, some systems transfer information from one application to another by connecting user accounts of the respective applications. However, constraints of application programming interface (API) systems heavily limit the ability of such connections to retrieve connected content in a timely and accurate manner. In particular, many existing system frameworks utilize a single authorization token to sync all data via a particular data source, which often conflicts with multi-level access rights at the destination systems due to having many different devices/accounts with varying levels of access and makes it difficult to efficiently and accurately determine and enforce appropriate permissions for a given device/account to specific data. Many conventional systems try to address access to third-party content items across multiple users by utilizing architectures to build team connections between individual accounts. Despite these advances, however, existing systems continue to suffer from a number of disadvantages, particularly in terms of accuracy and efficiency.

As just mentioned, some existing systems suffer from computational inefficiencies. In some cases, various existing systems maintain individual connections to external applications for multiple user accounts associated with a server and utilize the individual connections to retrieve content. However, as external applications often enforce strict API usage quotas or throttle excessive requests, many existing systems quickly exceed these limits, causing delays or partial failures. Existing systems also often expend additional computational and storage resources to repeatedly sync and store duplicate digital content items, such as messages associated with more than one user account. Processing and storing multiple copies of the same content increases computational overhead that increases corresponding to the amount of content synced or indexed by multiple user accounts. Thus, many existing systems that establish separate individual connections from different users to the same content across applications are computationally inefficient.

Additionally, some existing systems are inaccurate or imprecise. In particular, many existing systems often fail to generate and operate accurate search indexes as some data may not be visible or accessible due to differences in user permissions across systems. To illustrate, existing systems that process content according to permissions on a per-user basis may slow down systems and exclude useful content, thus rendering query responses incomplete or inaccurate. Further, as systems with strict API limits can cause delays or partial failures, as discussed previously, searches exceeding the API limits can interrupt content retrieval and provide erroneous results.

Some existing systems attempt to overcome the above-mentioned shortcomings by creating and maintaining shared connections created by a group connection (or admin) on behalf of a group of users to generate a search index. However, shared connections can also be computationally expensive and inflexible. Indeed, many existing systems, such as some third-party repositories, do not support shared connections and are limited to utilizing individual connections. Additionally, many systems that do support shared connections generate content indexes in response to a search query, forcing search-related computational resources to be dedicated to deduplicating content while processing a query. By wasting computational resources on post-call deduplication of a search index, if a search index is supported, current systems run the risk of lag, inaccurate data, and hitting API limits. Thus, while current systems can reduce duplication and improve efficiency in some ways, building and maintaining a search index to flexibly response to an API call is computationally expensive and often inaccurate.

SUMMARY

This disclosure describes one or more embodiments of systems, methods, and non-transitory computer readable storage media that provide benefits and/or solve one or more of the foregoing and other problems in the art. For instance, the disclosed systems facilitate the retrieval of digital content from an external application according to a software connection comprising a plurality of federated connections. In particular, the disclosed systems identify (or determine) a plurality of federated connections linking a content management system and an external application, where each federated connection is associated with a user account of the content management system. Additionally, the disclosed systems, in some cases, utilize a sync engine to generate a content graph that defines relationships/mappings between digital content of the external application and the federated connections associated with the user accounts that have access to the digital content. In various embodiments, the disclosed systems generate the content graph by crawling the federated connections to determine corresponding digital content items and comparing digital content items accessible by the federated connections to consolidate duplicate items prior to syncing. Moreover, the disclosed systems use the sync engine to retrieve digital content from the external application through the software connector according to the mappings in the content graph.

BRIEF DESCRIPTION OF THE DRAWINGS

This disclosure will describe one or more embodiments of the invention with additional specificity and detail by referencing the accompanying figures. The following paragraphs briefly describe those figures.

DETAILED DESCRIPTION

Figure 1:
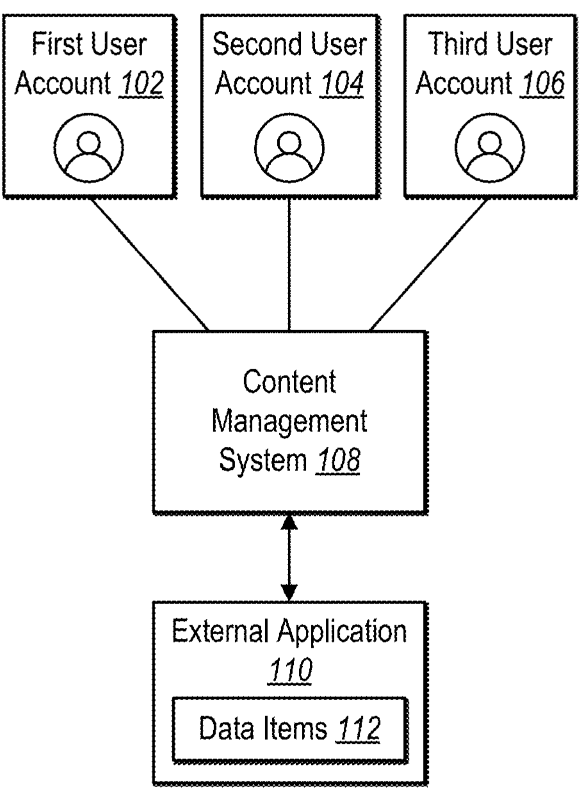
FIG. 1 illustrates an example overview of a federated connection system requesting digital content from an external application in accordance with one or more embodiments.

This disclosure describes one or more embodiments of a federated connection system that requests digital content from an external application via federated connections. In particular, the federated connection system uses a software connector including a plurality of federated connections that are associated with separate user accounts of a content management system. By crawling the plurality of federated connections to determine accessible content for each federated connection using a sync engine, the federated connection system generates a content graph that maps the federated connections to digital content items for use in syncing content items while preventing content duplication. In particular, the federated connection system can generate a content graph including nodes representing accessible digital content and mappings between the digital content (e.g., nodes) and the federated connections. The federated connection system requests/syncs digital content from the external application to the content management system through the tenant connection using the federated connections and the content graph. In some cases, the federated connection system also maintains and updates the content graph in a self-healing process by detecting and pruning tokens corresponding to duplicate/inactive connections or based on permissions changes.

As indicated above, in some embodiments, the federated connection system identifies a software connector including a plurality of federated connections. In some embodiments, the federated connection system determines (or identifies) a primary tenant connection and federated connections associated with the tenant connection that link a content management system and an external application outside of the content management system. For example, the federated connections are associated with respective user accounts of the content management system and connect the respective user accounts to the external application through the tenant connection. In some cases, the federated connection system utilizes the federated connections, through the tenant connection, to request digital content from the external application accessible by the user account associated with the federated connection to the content management system.

As mentioned, the federated connection system can generate a content graph including nodes and mappings by using a sync engine to crawl the plurality of federated connections and determine digital content accessible by each federated connection. For example, the federated connection system can generate a content graph comprising nodes representing digital content from the external application to sync with the content management system. In addition, the federated connection system, within the content graph, generates mappings between federated connections and nodes associated with digital content of the external application that the federated connections can access. In some cases, the federated connection system generates the content graph by deduplicating content items prior to syncing across applications via comparing digital content accessible by the federated connections. In some embodiments, the federated connection system generates the content graph as a structured database including a set of mappings between the digital content and the respective federated connections.

In some embodiments, the federated connection system requests digital content from the external application to the content management system, such as in a syncing process. More specifically, according to a mapping within the content graph, the federated connection system requests digital content from an external application through the software connector according to the respective federated connection. In various cases, the federated connection system can request, by the sync engine, digital content from the external application by using the content graph to determine that the federated connection has access to the digital content and requests the digital content through a tenant connection.

As noted, in some embodiments, the federated connection system performs a self-healing process by updating the content graph to maintain a continuous listing of relationships between digital content and federated connections. In particular, the federated connection system can remove mappings between federated connections and various nodes in response to indications of inaccessibility of digital content items for the federated connections. For example, in cases where the federated connection no longer has access to the digital content item, the federated connection system can remove the federated connection from a mapping between the digital content item and federated connections that have access to the digital content item.

As suggested above, the federated connection system can provide several improvements or advantages over existing content retrieval systems. For example, some embodiments of the federated connection system can improve flexibility over prior systems. As opposed to existing systems that rigidly require one token per connection, the federated connection system has the unique ability to enable multiple tokens per connection (e.g., through a tenant token and a plurality of user tokens connected to the tenant token). For instance, the federated connection system can facilitate the connection of a plurality of federated connections that correspond to the digital content accessible by a plurality of user accounts associated with an external application and a content management system. As a result, the federated connection system can retrieve digital content from a variety of external applications while limiting the number of API calls to the external applications, which is especially relevant for external applications with strict wait limits and/or high volumes of overlapping digital content (e.g., conversations or channels with multiple group members in a channel-based digital communication application).

Due at least in part to its improved flexibility, the federated connection system can also improve computational efficiency over prior systems. For example, by having a plurality of tokens (e.g., for a plurality of federated connections) available prior to a request for digital content associated with the tokens, the federated connection system eliminates the need for post-request deduplication, resulting in significant efficiency gains compared to conventional systems. In contrast to existing content retrieval systems that rely on individual user-level connectors to repeatedly ingest and store potentially redundant digital content from third-party systems (thereby requiring deduplication after retrieval), the federated connection system can use a sync engine to generate a content graph prior to API calls. Furthermore, instead of storing duplicative digital content items, the federated connection system proactively deduplicates content prior to syncing by comparing sets of nodes associated with each federated connection when generating/updating the content graph.

Further, the federated connection system can improve the accuracy of search indexes relatively to existing content retrieval systems. In particular, the federated connection system improves content retrieval efficiency and accuracy by storing synthesized content items in a content graph. In contrast to existing systems that store multiple copies of the same digital content within a search index or deduplicate after receiving a request to retrieve content, the federated connection system can generate a content graph with a single item determined to be a duplicate digital content item prior to receiving an API call and mapping the content item to multiple federated connections. By generating a content graph devoid of duplicate copies of digital content, the federated connection system reduces the size of the search index, leading to faster query processing and lower storage requirements. Indexing a single synthesized content item further ensures that digital content frequencies are accurately calculated, which improves the relevance of search results.

As mentioned above, the federated connection system 100 (illustrated in FIG. 10) can retrieve data items from an external application via federated connections. FIG. 1 illustrates an example overview of a federated connection system 100 requesting digital content from an external application in accordance with one or more embodiments. Additional detail regarding the various acts and processes introduced in FIG. 1 is provided thereafter with reference to subsequent figures.

As illustrated in FIG. 1, the federated connection system 100 facilitates the retrieval of digital content (e.g., data items 112) from an external application 110 to a content management system 108. In particular, the federated connection system 100 utilizes a software connector including federated connections corresponding to user accounts associated with a content management system 108 (e.g., a first user account 102, a second user account 104, a third user account 106). For example, the federated connection system 100 utilizes a first federated connection according to a token associated with a first user account 102, the token having a set of permissions in accessing data items 112 of the external application 110. In particular, the federated connection system 100 utilizes a first federated connection according to a token having a subset of permissions (e.g., user-level permissions) less than that of an admin token or other token with full permissions (e.g., access to all data of the external application 110). In some embodiments, the software connector also includes a tenant connection linking to the federated connections to the external account (e.g., in a parent-child relationship).

Specifically, the federated connection system 100 generates (or identifies) the software connector that connects user accounts of the content management system 108 to the data items 112 of the external application 110. For instance, the federated connection system 100 utilizes a software connector to connect the content management system 108 to the external application 110 (i.e., a single connection between the content management system 108 and the external application 110) and federated connections associated with user accounts to access or sync data items 112 from the external application 110 to those user accounts (in some cases in combination with a tenant connection). As used herein, the term "content management system" refers to a software application system that can be used to create, facilitate, access, and/or manage digital documents across one or more computer networks. In particular, a content management system can provide a centralized platform (including a local network system or a cloud-based system) for managing and organizing digital content, while also facilitating digital content item (e.g., document) management across user accounts. For example, DROPBOX is a content management system that provides many digital content management functions, including file synchronization across devices and between user accounts, real-time editing, commenting, version control, and task assignment. Furthermore, content management systems can import digital content items from third-party systems.

Furthermore, as used herein, the term "third-party system" refers to a computing system or external application that performs one or more functions that correspond to a third-party external to a content management system. For example, a third-party system can enable performing certain tasks such as, but not limited to, data storage, photo editing, document creation, financial reporting, medical recording, etc. In one or more embodiments, a third-party system's functionality can be accessed via third-party applications comprising a desktop application, mobile-based operating application, or web-based application. Accordingly, as used herein, an "external application" refers to a software system hosted on a third-party system external to (or outside of) a content management system.

As also used herein, the term "digital content item" (or simply "content item") refers to a digital object or a digital file that includes information interpretable by a computing device (e.g., a client device) to present information to a user. A digital content item can include a file or a folder such as a digital text file, a digital image file, a digital audio file, a webpage, a website, a digital video file, a web file, a link, a digital document file, or some other type of file or digital object. A digital content item can have a particular file type or file format, which may differ for different types of digital content items (e.g., digital documents, digital images, digital videos, or digital audio files). In some cases, a digital content item can refer to a remotely stored (e.g., cloud-based) item or a link (e.g., a link or reference to a cloud-based item or a web-based content item) and/or a content clip that indicates (or links/references) a discrete selection or segmented sub-portion of content from a webpage or some other content item or source. A content item can also include application-specific content that is specific to a particular computer application and is accessible via a file system or via a network connection. A digital content item can be editable or otherwise modifiable and can also be sharable from one user account (or client device) to another. In some cases, a digital content item is modifiable by multiple user accounts (or client devices) simultaneously and/or at different times.

Relatedly, as used herein, the term "tenant connection" refers to a shared integration that enables multiple users within a group or organization to access third-party data through a single data ingestion path. In particular, a tenant connection retrieves (or accesses) data accessible by a set of tokens (federated connections) associated with user accounts. In some cases, a tenant connection has access to digital content items (or data) accessible within an external application (e.g., using a tenant token). Additionally, in some embodiments, the tenant connection connects a tenant token to a plurality of individual user account tokens of the federated connections.

As used herein, the term "federated connection" refers to a scoped integration between a content management system and an external application via a tenant connection, where access to data is authorized through a unique token tied to a specific user account. In particular, the underlying token encapsulates a subset of permissions given to a user and governs what content or operations the system can perform on the user's behalf. A federated connection can operate independently across multiple accounts, without requiring centralized ownership of the external data.

As also used herein, the term "content graph" refers to a structured representation of digital content and its access relationships, where each node corresponds to a distinct digital content item-such as a document, message, file, or record-retrieved from an external application. The content graph includes mappings between content nodes and the specific federated connections that have permission to access them.

Figure 2:
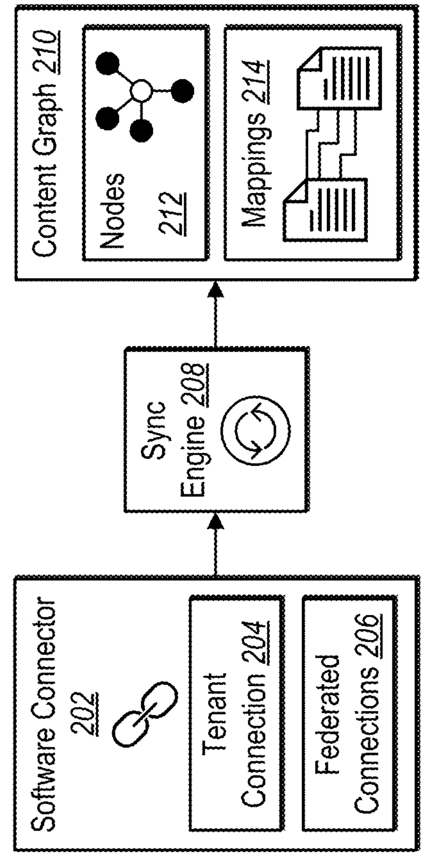
FIG. 2 illustrates an example diagram of generating a content graph via a software connector in accordance with one or more embodiments.

As mentioned above, in certain described embodiments, the federated connection system 100 generates a content graph of content access for user accounts of a content management system by utilizing a software connector. In particular, the federated connection system 100 can use a sync engine in combination with a software connector to generate a content graph indicating relationships between user accounts/tokens and content. FIG. 2 illustrates an example diagram of generating a content graph via a software connector in accordance with one or more embodiments.

As illustrated in FIG. 2, the federated connection system 100, as discussed previously, determines a software connector 202. In various cases, the federated connection system 100 generates (or identifies) a software connector 202 that includes a tenant connection 204 and federated connections 206. Specifically, via the tenant connection 204 of the software connector 202, the federated connection system 100 enables access to external data items by a content management system. In these or other cases, the federated connection system 100 utilizes the federated connections 206 of the software connector 202 to access user-level digital content of an external application. In some embodiments, the federated connection system 100 utilizes the tenant connection 204 as a parent-level connection and accesses public digital content (e.g., content accessible across multiple federated connections), as discussed further in relation to FIG. 3.

In response to a request for digital content of an external application, the federated connection system 100 can utilize the federated connections 206 (e.g., with corresponding tokens in addition to the tenant connection 204) to access digital content accessible by the user accounts associated with the federated connections 206. Specifically, the federated connection system 100 receives a request from a content management system to access a digital content item of an external application. In some cases, the federated connection system 100 utilizes federated connections 206 associated with user accounts of a content management system to retrieve (or request) digital content items from the external application to the content management system.

As further illustrated in FIG. 2, the federated connection system 100 utilizes a sync engine 208 to generate the content graph 210 that maps the digital content items of the external application to the connections of the software connector 202 (e.g., the tenant connection 204 and/or the federated connections 206). More particularly, the federated connection system 100, in some cases, crawls the federated connections 206 via the sync engine 208 to determine accessible content from the external application for each federated connection, as discussed further in relation to FIG. 7. For example, the federated connection system 100 utilizes the sync engine 208 to identify digital content accessible through the software connector 202 (e.g., leveraging the tenant connection 204 and the federated connections 206) to generate a content graph 210 prior to syncing between the content management system and the external application (e.g., prior to a request for digital content to the content management system from the external application).

As shown in FIG. 2, the federated connection system 100 generates a content graph 210 from the digital content accessible by the software connector 202 by utilizing the sync engine 208. In one or more cases, the federated connection system 100 can generate the nodes 212 corresponding to the data (e.g., digital content items) of the external application determined accessible by the sync engine 208 for the respective user accounts/tokens. In particular, the nodes 212 represent digital content items of the external application accessible by the tenant connection 204 or the federated connections 206 via their associated user accounts (e.g., by utilizing tokens associated with the user accounts of the content management system).

As also shown in FIG. 2, the federated connection system 100 generates the mappings 214 of the content graph 210. In various cases, the federated connection system 100 generates mappings 214 between digital content items (e.g., nodes 212) and the software connector 202 (e.g., federated connections 206 or the tenant connection 204). In particular, the federated connection system 100 generates an organizational structure (e.g., content graph 210) including mappings 214 that indicate which connections (e.g., tenant connection 204 or federated connections 206) of the software connector 202 provide access to which nodes 212 (e.g., digital content items of the external application). In processing a query within a content management system for digital content of an external application, the federated connection system 100 utilizes the mappings 214 of the content graph 210. Specifically, the federated connection system 100 utilizes the mappings 214 to determine which federated connections 206 to utilize to retrieve the applicable digital content of the external application.

Figure 3:
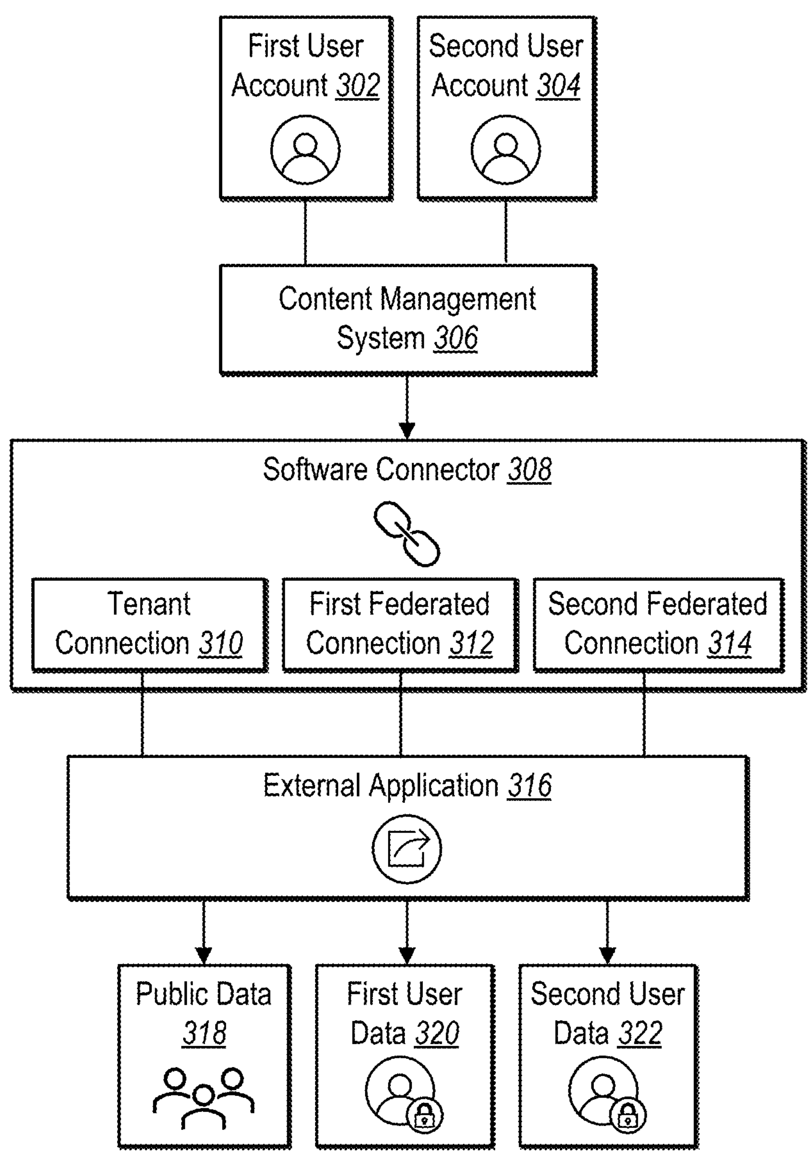
FIG. 3 illustrates an example diagram of retrieving digital content from an external application by utilizing federated connections in accordance with one or more embodiments.

As noted above, in certain embodiments, the federated connection system 100 generates a content graph to sync content items between a content management system and an external application. In particular, the federated connection system 100 retrieves data items from an external application according to permissions associated with user accounts of the content management system. FIG. 3 illustrates an example diagram of retrieving digital content from an external application by utilizing federated connections in accordance with one or more embodiments.

As illustrated in FIG. 3, in some cases, the federated connection system 100 utilizes a software connector 308 to retrieve (or sync) digital content from an external application 316 to a content management system 306. In one or more embodiments, the federated connection system 100 utilizes a software connector 308 that comprises a tenant connection 310 and a plurality of federated connections (e.g., first federated connection 312 and second federated connection 314). In particular, the federated connection system 100 generates (or identifies) the first federated connection 312 from the first user account 302 associated with the content management system 306. Similarly, in various cases, the federated connection system 100 generates (or identifies) the second federated connection 314 corresponding to the second user account 304 associated with the content management system 306.

In some embodiments, the federated connection system 100 generates the federated connections that include a subset of permissions (e.g., via a token) corresponding to a user account associated with the content management system 306. According to the permissions granted to the associated user account, the federated connection system 100 can access digital content items accessible to that associated user account within the external application (e.g., user-level data and/or private data). Specifically, the federated connection system 100, in various cases, access the digital content items available to the federated connections through the tenant connection 310 of the software connector 308. For example, the federated connection system 100, by utilizing a first federated connection 312 associated with first user account 302, accesses first user data 320 within the external application 316. Similarly, the federated connection system 100 can, by using the second federated connection 314, access data accessible to second user account 304 (e.g., second user data 322) within the external application 316.

In addition, in various embodiments, the federated connection system 100 utilizes the tenant connection 310 to access data within the external application 316. Specifically, in some embodiments, the federated connection system 100 utilizes the tenant connection 310 to access public data 318 (e.g., data generally accessible within the external application 316). In one or more embodiments, the federated connection system 100 accesses public data 318 through the tenant connection 310, with the tenant connection 310 acting as an admin-level token and/or parent token, thereby accessing data available to more than one user account of the external application 316. In further embodiments in which the tenant connection 310 is associated with an admin token, the federated connection system 100 can provide access to the tenant connection 310 to public and certain private data or channels, depending on the admin access rights.

Additionally, in various cases, the federated connection system 100 accesses public digital content items (e.g., public data 318) through a federated connection. Specifically, in some embodiments without a tenant connection, the federated connection system 100 utilizes a federated connection (e.g., first federated connection 312) to access public data 318. In one or more cases, the federated connection system 100 requests a private digital content item from the external application by identifying a hierarchical token system including the admin token and a user token, and accessing the private digital content item through the admin token.

Figure 4:
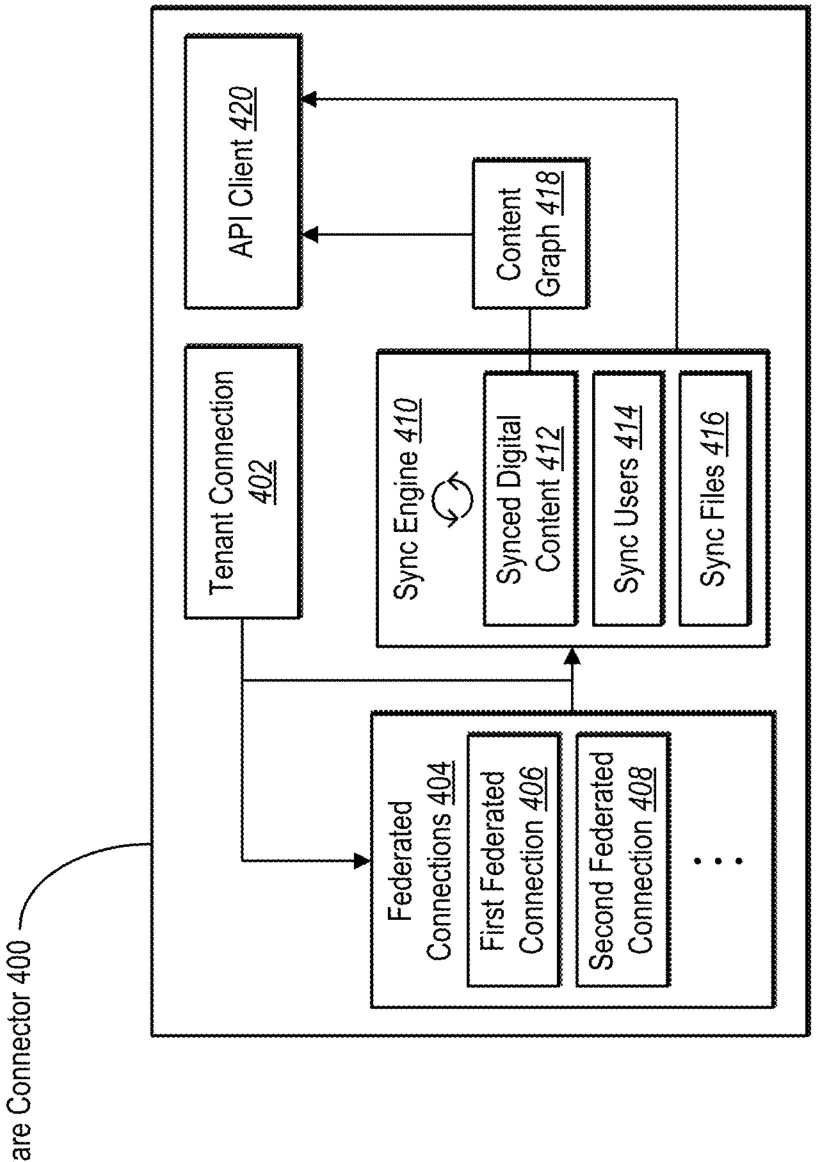
FIG. 4 illustrates an example diagram of accessing private content of an external application through a tenant connection in accordance with one or more embodiments.

As discussed previously, in various embodiments, the federated connection system 100 utilizes a software connector to generate a content graph. Specifically, by utilizing a sync engine, the federated connection system 100 generates a content graph comprising data items accessible by federated connections. FIG. 4 illustrates an example diagram of accessing private content of an external application through a tenant connection in accordance with one or more embodiments.

As shown in FIG. 4, the federated connection system 100 generates a sync engine 410 to generate a content graph 418. In particular, the federated connection system 100 utilizes the sync engine 410 to create a data structure (e.g., a search index) that includes the digital items accessible by the combination of federated connections 404 and the tenant connection 402. In various cases, the federated connection system 100 utilizes the sync engine 410 to compare digital content accessible by the tenant connection 402 and the federated connections 404 to identify (or determine) private data (or private digital content items). In some embodiments, the federated connection system 100 compares data accessible by a tenant connection 402 to data accessible by the federated connections 404 (e.g., first federated connection 406 and second federated connection 408) to generate the content graph 418 and identify paths to access private data.

As also shown in FIG. 4, the federated connection system 100, in various cases, generates the content graph 418 by integrating (e.g., synchronizing) the data accessible across the federated connections and the tenant connection. In particular, the federated connection system 100 compares data accessible by the federated connections 404 (e.g., synced digital content 412) to generate a content graph 418 with nonduplicative digital content items (e.g., for preventing duplication or repeated syncing of the same content items during a syncing process). For example, the federated connection system 100 compares the data accessible by the first federated connection 406 to the data accessible by the second federated connection 408 (e.g., corresponding to their respective associated user accounts) to identify discrete content items. In some cases where there are data items accessible to multiple federated connections 404, the federated connection system 100 generates a single node within the content graph 418 corresponding to a digital content item encountered (or identified) more than once with a plurality of edges/mappings indicating the access rights to the digital content item for multiple user accounts.

In some cases, the federated connection system 100 generates synced digital content 412 by iteratively crawling a combination of the federated connections 404 and the tenant connection 402. In various embodiments, the federated connection system 100 compares the data of the external application accessible by the federated connections 404 to the data accessible by the tenant connection 402. In particular, the federated connection system 100 can compare the first federated connection 406 to the tenant connection 402 to generate nodes of the content graph 418 corresponding to public digital content. For example, the federated connection system 100 can compare the first federated connection 406 to the tenant connection 402 and determine that certain digital content items are accessible to both. Based on this overlap, in some embodiments, the federated connection system 100 can determine that the overlapping digital content items are public digital content (e.g., content accessible to both a federated connection and the tenant connection). In response to determining an overlapping digital content item, the federated connection system 100, in some cases, generates corresponding nodes for the overlapping digital content items. For example, for a duplicative content item accessible to both the first federated connection 406 and the second federated connection 408 (or to both the first federated connection 406 and the tenant connection 402), the federated connection system generates a single node within the content graph 418.

Additionally, the federated connection system 100 establishes (or determines) mappings from the nodes representing the overlapping digital content items to corresponding connections of the software connector 400. In some embodiments, the federated connection system 100 generates a content graph 418 by generating a mapping (e.g., an associative connection) between the node representing digital content and connections able to access the digital content. For example, where both the tenant connection 402 and the first federated connection 406 can access digital content associated with a node, the federated connection system 100 generates a first mapping between first federated connection 406 and the node and a second mapping between a tenant connection 402 and the node.

In various embodiments, the federated connection system 100 utilizes the sync engine 410 to provide synced content to an API Client 420. For example, the federated connection system 100 can utilize a sync engine 410 to determine synced users 414 to provide to an API Client 420 prior to a query. Specifically, the federated connection system 100 can, in some cases involving a channel-type external application (e.g., including channel-based conversations), crawl federated connections 404 and tenant connection 402 to generate synced users 414. For instance, the federated connection system 100 crawls the conversations (e.g., channels) accessible by federated connections 404 to generate synced users 414 and synced files 416. In particular, the federated connection system 100 utilizes the sync engine 410 to compare the data available to the federated connections 404 and the tenant connection 402 and generate synced users 414 and synced files 416.

As used herein, "synced users" refers to users identified by the federated connection system 100 through crawling and comparing data accessible via federated connections and a tenant connection. In some cases, synced users represent a listing of individuals associated with accessible conversations or channels within an external application. As also used herein, "synced files" refers to digital content items (e.g., data files) discovered by the federated connection system by analyzing overlapping access between federated connections and a tenant connection, such as files found within overlapping channels of a channel-type external application.

In one or more embodiments, the federated connection system 100 provides the output of the sync engine 410 to an API Client 420 prior to a request to retrieve digital content items from an external application (e.g., prior to syncing across applications). In particular, by generating synced digital content 412, the federated connection system 100 generates a content graph 418 including one or more deduplicated content items prior to processing a query, thus reducing the computational overhead needed to process a request to retrieve data from the external application. In some cases, the federated connection system 100 provides synced content to an API Client 420 for use in retrieving content from an external application via software connector 400 prior to syncing between the external application and the content management system.

Furthermore, in one or more embodiments, the federated connection system 100 provides functionality for modifying the content graph (including the nodes and/or mapping between the nodes) based on changes to access rights associated with digital content. For example, in response to a modification to the access rights of a particular user account for a given item (e.g., removal of access rights), the federated connection system 100 can remove a mapping between the node of the digital content and the corresponding user account. The federated connection system 100 can also modify a mapping between a user account (e.g., a particular federated connection) and a particular node based on changed access rights for a content item by modifying metadata of the mapping in the content graph 418. Additionally, in one or more embodiments, the federated connection system 100 can also allow deletion of all data by deleting the tenant connection 402, since the federated connections 404 are all child connections of the tenant connection 402 and all data is indexed via the tenant connection 402 instead of being indexed via the federated connections 404.

Figure 5:
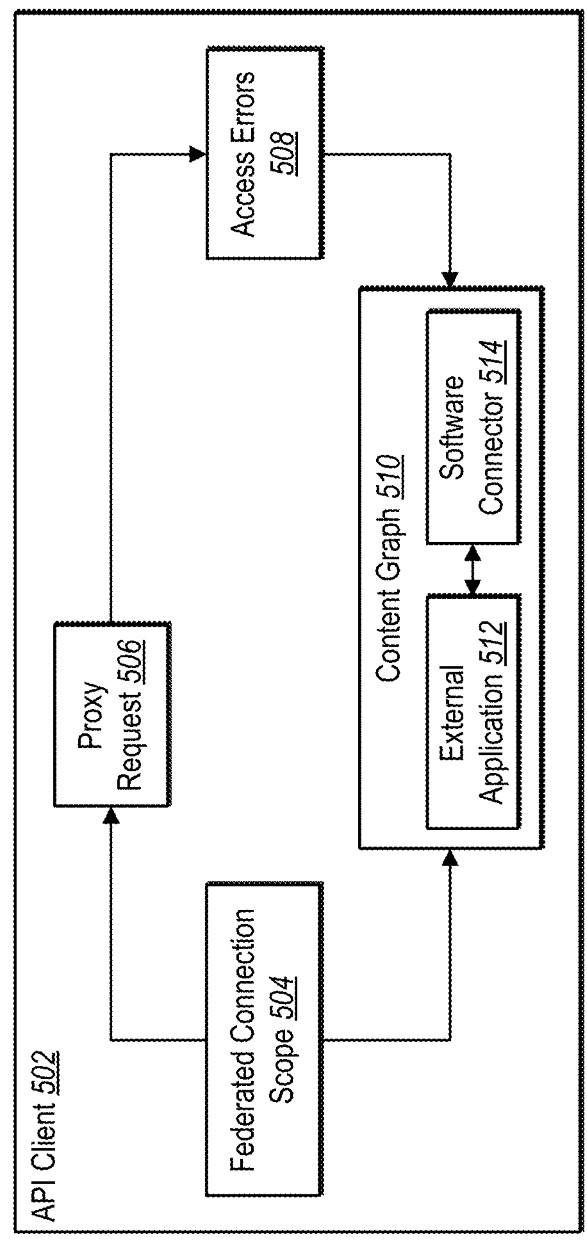
FIG. 5 illustrates an example diagram of utilizing an application programming interface (API) client to access digital content associated with a content graph in accordance with one or more embodiments.

As mentioned above, in certain described embodiments, the federated connection system 100 provides synced content to an API client for use in retrieving data from an external application. In particular, the federated connection system 100 accesses a content graph via federated connections in response to an API call. FIG. 5 illustrates an example diagram of utilizing an application programming interface (API) client to access digital content associated with a content graph in accordance with one or more embodiments.

As illustrated in FIG. 5, the federated connection system 100 utilizes an API Client 502 to retrieve the digital content requested from an external application 512 to a content management system via a content graph 510. In various embodiments, before processing a proxy request 506, the federated connection system 100 fetches the federated connection scope 504 (e.g., token scope) to generate content graph 510. In these or other cases, the federated connection system 100 fetches federated connection scope 504 indicating the subset of permissions granted to the associated user accounts.

In various embodiments, the federated connection system 100 retrieves the federated connection scope 504 to generate a content graph 510 and consolidate duplicate items prior to syncing across applications (e.g., from the external application 512 to the original content management system). In particular, the federated connection system 100 generates the content graph 510 with discrete nodes representing digital content accessible by the software connector 514. For example, the federated connection system 100, in cases where multiple federated connections of the software connector 514 access the same user-level content, generates a discrete node for the digital content accessible by multiple federated connections (e.g., a single node for duplicative content items). In particular, the federated connection system 100 can generate the discrete node by syncing the duplicate digital content item associated with a first federated connection and ignoring the duplicate digital content item associated with the second federated connection. Similarly, for a node representing digital content accessible by multiple federated connections, the federated connection system 100 can generate multiple mappings between the node and those federated connections that can access the associated digital content.

As illustrated in FIG. 5, the federated connection system 100 can generate a proxy request 506 in response to a request within a content management system to retrieve digital content from an external application 512. In some cases, the federated connection system 100 does not directly retrieve the requested content from the external application but utilizes the API Client 502 to generate a proxy request 506. In particular, the federated connection system 100 can handle the proxy request 506 by processing the proxy request made on behalf of the content management system. In some embodiments, federated connection system 100, via the API Client 502, sends the processed request to the external application 512. In one or more cases, the federated connection system 100 transfers the proxy request to the external application 512 (e.g., by utilizing content graph 510) to retrieve the data specified within the original request provided to the content management system.

In these or other embodiments, and as illustrated in FIG. 5, the federated connection system 100 can handle access errors 508 that are encountered in attempting to retrieve content specified by the proxy request. In one or more cases, the federated connection system 100 can identify or receive an indication of inaccessibility of a requested digital content item. For example, the federated connection system 100 receives an indication that the digital content item is no longer accessible by utilizing a federated connection that previously could access the digital content item. Alternatively (or additionally), the federated connection system 100 can receive an indication that the federated connection previously indicated as an accessible pathway to a requested digital item (e.g., within the content graph 510) is no longer available. In various cases, the federated connection system 100 can facilitate the remediation of access errors 508 encountered by the API Client 502 in utilizing the software connector 514 (e.g., federated connections) to retrieve data from the external application 512, as discussed further in relation to FIG. 6.

As also illustrated in FIG. 5, the federated connection system 100 can access content graph 510 to retrieve digital content requested via the content management system. In response to a request to retrieve digital content from the external application 512 (e.g., via the proxy request 506), the federated connection system 100 may access content graph 510 to determine which connection of the software connector 514 to utilize in retrieving the requested digital content. For example, the federated connection system 100 accesses content graph 510 including nodes representing digital content of the external application 512 accessible by the software connector 514 and mappings between those nodes and the federated connections of the software connector 514. In particular, the federated connection system 100 accesses the content graph 510 including the mappings between the federated connections that facilitate access to user-level digital content of the external application 512 and the nodes. For example, for a channel-type external application, the federated connection system 100 can access a content graph 510 that indicates a channel (e.g., a node) is accessible by multiple federated connections (e.g., multiple users). In accessing the data of the channel (e.g., messages of a group chat) from a content management system, the federated connection system 100 can utilize any (or multiple) of the multiple federated connections mapped to that channel.

In various embodiments, the federated connection system 100 accesses the digital content requested through the proxy request 506 as a live request. In particular, the federated connection system 100 can retrieve a digital content item through the associated federated connections by performing a real-time call to the external application instead of during a sync operation. In some embodiments, the federated connection system 100 processes the live request by transmitting a query or an API call to the external application at the time of the request, receiving a corresponding response from the external application, and returning the response to the requesting client. In various cases, by performing a live request through the federated connections, the federated connection system 100 ensures the retrieved digital content reflects the most current version available from the external application.

Figure 6:
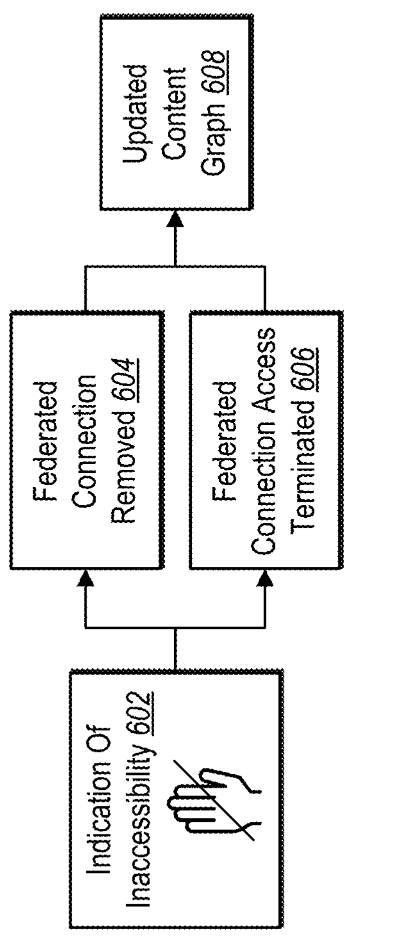
FIG. 6 illustrates an example diagram of generating an updated content graph in response to receiving an indication of inaccessibility in accordance with one or more embodiments.

As indicated above, in certain described embodiments, the federated connection system 100 generates an updated content graph in response to an indication of inaccessibility of digital content mapped within the content graph. In particular, in response to an indication of inaccessibility, the federated connection system 100 removes mappings of the content graph to reflect changes in federated connections. FIG. 6 illustrates an example diagram of generating an updated content graph in response to receiving an indication of inaccessibility in accordance with one or more embodiments.

As shown in FIG. 6, in some embodiments, the federated connection system 100 receives an indication of inaccessibility 602 (e.g., an access error) that the software connector does not have access to a digital content item requested. For example, the federated connection system 100 receives an indication of inaccessibility 602 of a digital content item of the external application that was previously accessible via a federated connection of the software connector. In some such cases, the federated connection system 100 modifies the content graph (e.g., generates updated content graph 608) to reflect the inaccessibility. In various embodiments, the federated connection system 100 receives an indication of inaccessibility indicating that the federated connection access was terminated 606. For instance, if a first federated connection previously accessed a digital content item of the external application but is no longer able to, the federated connection system 100 removes the mapping between that digital content item and the first federated connection of the software connector to generate updated content graph 608. In various cases where the content graph included multiple mappings between the digital content item and federated connections (e.g., a first federated connection and a second federated connection), the federated connection system 100 removes the inaccessible mapping from the first federated connection and accesses the digital content item through an alternative federated connection (e.g., the second federated connection).

In one or more cases, the federated connection system 100 receives an alternative (or additional) indication of inaccessibility 602 of a digital content item of the external application. In particular, the federated connection system 100, in some embodiments, receives an indication that a federated connection associated with the digital content item does not exist (e.g., federated connection removed 604). For example, the federated connection system 100 determines that the federated connection itself (e.g., the token associated with a user account) has been revoked or the user of the user account has removed permissions granting the content management system access to the digital content accessible by the user account within the external application. In some such cases, the federated connection system 100, in response to detecting the indication of inaccessibility 602 related to deletion of the federated connection, modifies the content graph to generate updated content graph 608. For instance, the federated connection system 100 removes a mapping of the node associated with the digital content item to the federated connection that no longer exists from the content graph.

Similarly, the federated connection system 100 performs a self-healing process by detecting and pruning tokens corresponding to duplicate/inactive connections or based on permissions changes. In particular, the federated connection system 100 can update the content graph (e.g., generate an updated content graph 608) by periodically (or in response to a sync trigger) re-crawling the federated connections, as discussed in relation to FIG. 7. Specifically, the federated connection system 100 can implement or facilitate a self-healing process by comparing the content graph (in its previous iteration) to the digital content items that the federated connections can access at the time of the self-healing process. In various cases, the federated connection system 100 activates the self-healing process in response to detecting a self-healing trigger such as adding a new content item to the external application, the addition of a new federated connection to the software connector, and/or the detection of a modified token associated with a federated connection. In these or other embodiments, the federated connection system 100 activates the self-healing process in response to detecting a time-based self-healing trigger, such as the expiration of a routine timer and/or at the time of a software update of the external application or the content management system.

Figure 7:
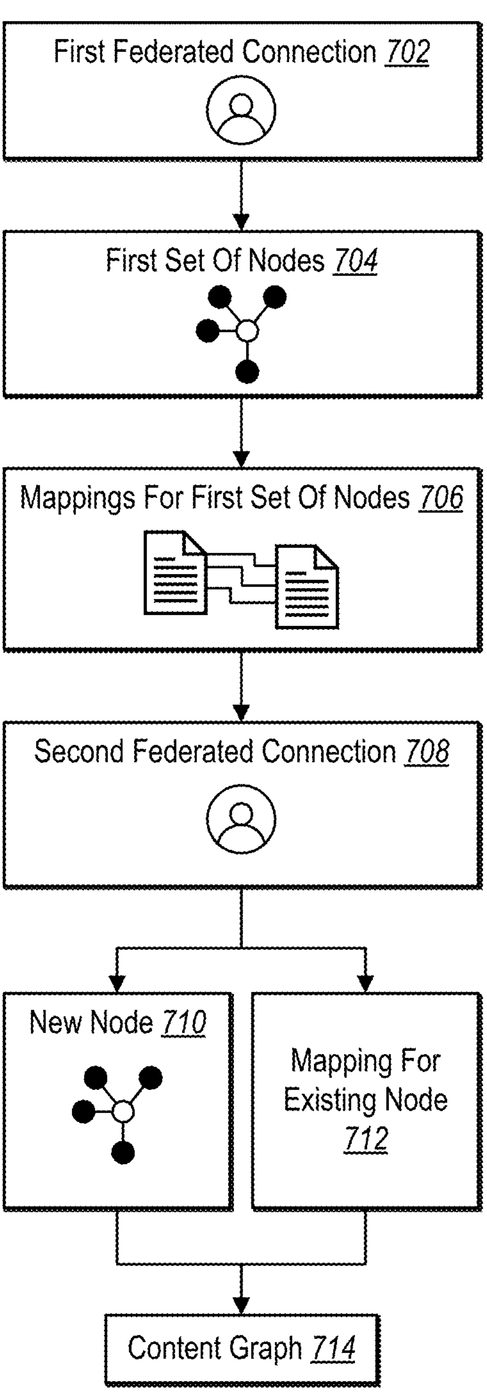
FIG. 7 illustrates an example diagram of generating a content graph by mapping federated connections to nodes associated with digital content in accordance with one or more embodiments.

As discussed previously, in various embodiments, the federated connection system 100 generates a content graph by crawling the software connector (e.g., the tenant connection and the federated connections). Particularly, the federated connection system 100 generates the content graph by integrating the data accessible across the federated connections and the tenant connection. FIG. 7 illustrates an example diagram of generating a content graph by mapping federated connections to nodes associated with digital content in accordance with one or more embodiments.

As shown in FIG. 7, the federated connection system 100 generates a content graph from a plurality of federated connections (and/or a tenant connection). Particularly, in some cases, the federated connection system 100 generates a first set of nodes 704 from a first federated connection 702. In various embodiments, the federated connection system 100 generates a first set of nodes 704 corresponding to the digital content items within an external application accessible by the first federated connection 702. For example, for a channel-type external application, the federated connection system 100 generates a first node corresponding to a direct message, a second node corresponding to a group message, and a third node corresponding to a team channel.

As also shown in FIG. 7, the federated connection system 100 generates mappings for the first set of nodes 706. In some cases, the federated connection system 100 generates a first set of mappings corresponding to the first set of nodes 704 of the first federated connection 702. Specifically, in various embodiments, the federated connection system 100, within the content graph 714, generates an associative relationship between the first federated connection 702 and the content nodes based on content accessible by the first federated connection 702. For example, the mappings for the first set of nodes 706 allow the federated connection system 100 to know which content items are accessible via which federated connection and/or how to retrieve, update, or request those content items.

As illustrated in FIG. 7, the federated connection system 100 performs a comparative analysis of mappings between the first set of nodes 706—each representing digital content items already indexed in the content graph 714—and a second federated connection 708 associated with the same software connector. In particular, the federated connection system 100 compares the digital content items accessible by the second federated connection 708 to the first set of nodes 704 to evaluate whether the digital content items accessible through the second federated connection 708 corresponding to existing nodes (e.g., the first set of nodes 704).

For instance, the federated connection system 100 determines whether a content item accessible by the second federated connection 708 is already represented within the content graph (e.g., within the first set of nodes 704). In some cases including overlap between the first set of nodes 704 and the digital content items of the second federated connection 708 (e.g., upon detecting duplicative content), the federated connection system 100 avoids generating an additional (or redundant) node for the content graph 714. Rather, the federated connection system 100 updates the content graph 714 by generating a mapping for an existing node 712. For example, upon detecting content accessible by both the first federated connection 702 and the second federated connection 708, the federated connection system 100 determines a mapping for an existing node 712 by connecting the second federated connection 708 to a node of the first set of nodes 704 representing the duplicative content. In various embodiments, the federated connection system 100 generates the content graph 714 by comparing a second set of nodes corresponding to the digital content items accessible by the second federated connection 708 to the first set of nodes 704. By comparing the first set of nodes 704 and the second set of nodes, the federated connection system 100 generates a final set of nodes comprising the first set of nodes and a subset of the second set of nodes (e.g., nodes of the second set of nodes absent from the first set of nodes).

Conversely, upon detecting digital content of the external application accessible by the second federated connection 708 not present within the first set of nodes 704, the federated connection system 100 can generate a new node 710 for the content graph 714. In particular, the new node 710 represents a distinct content item, and is mapped accordingly to the second federated connection 708 and not the first federated connection 702. In various cases, the federated connection system 100 iteratively crawls the federated connections (and tenant connection) of the software connector to generate a content graph 714 devoid of duplicative nodes. Particularly, the federated connection system 100 generates this nonduplicative content graph prior to a request from a content management system to retrieve content items of the external application.

Figure 8:
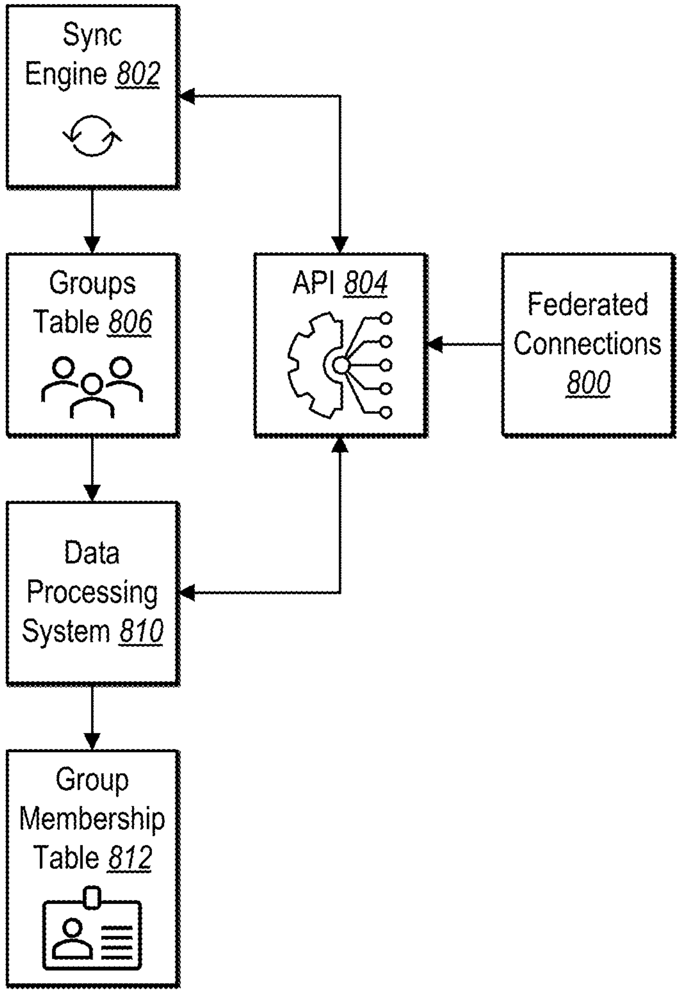
FIG. 8 illustrates an example diagram of generating a group membership table in accordance with one or more embodiments.

As mentioned above, in certain embodiments including channel-type external applications, the federated connection system 100 generates a content graph. In particular, the federated connection system 100 can utilize a groups table and/or a group membership table to update content graphs associated with channel-type external applications. FIG. 8 illustrates an example diagram of generating a group membership table in accordance with one or more embodiments.

As illustrated in FIG. 8, the federated connection system 100, in some cases, utilizes a software connector (e.g., sync engine 802) to populate a list of conversations (e.g., groups table 806) accessible via the federated connections 800. In particular, by utilizing an API 804 associated with the external application, the federated connection system 100, in various embodiments, populates the groups table 806 corresponding to the conversations of the external application accessible by the federated connections 800. In one or more embodiments, the federated connection system 100 generates the groups table 806 as it would generate the nodes of a content graph, as discussed in relation to FIG. 7. For example, the federated connection system 100 prevents generating duplicate groups within the groups table 806 by upserting (e.g., updating or inserting) groups into the groups table as the federated connection system 100 crawls the federated connections 800.

As also illustrated in FIG. 8, the federated connection system 100 can utilize a data processing system (DPS) to generate a group membership table 812. In particular, the data processing system 810 utilizes the API 804 to determine the membership of each group listed in the groups table 806 (e.g., as generated by sync engine 802). Specifically, the federated connection system 100 receives a list of members of the various groups present in the external application via the API 804. By combining the list of members from the API 804 with the groups table 806, the federated connection system 100 can generate group membership table 812.

In various embodiments, the federated connection system 100 can split the responsibilities of determining groups (nodes) and determining group membership between the sync engine 802 and the data processing system 810. By splitting the responsibilities, the sync rate is improved as the rate limit of the external application is on a per-API basis and the two flows (e.g., the conversation list and the members list) use different APIs. In some cases, the federated connection system 100 does not further sync the two processes as DPS does not need the state of the existing groups other than determining that the group (e.g., conversation) is archived.

In one or more embodiments, the federated connection system 100 passes the generation of the groups table 806 and the group membership table 812 to a separate system (e.g., external to the federated connection system). In particular, the federated connection system 100 can utilize the output of the separate system (e.g., the groups table 806 and the group membership table 812) to resolve group membership information and permissions without issuing repeated queries to the external application. In some such cases, the federated connection system 100 can reduce necessary API calls generated by the federated connection system 100, avoiding resource-intensive operations associated with computing group structures internally.

FIGS. 1-8, the corresponding text, and the examples provide a number of different systems and methods for utilizing federated connections to retrieve digital content items from an external system to a content management in accordance with one or more embodiments. In addition to the foregoing, implementations can also be described in terms of flowcharts comprising acts steps in a method for accomplishing a particular result. For example, FIG. 9 illustrates an example series of acts for requesting digital content from an external application to a content management system in accordance with one or more embodiments.

Figure 9:
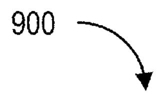
FIG. 9 illustrates an example series of acts for requesting digital content from an external application to a content management system in accordance with one or more embodiments.
Figure 9:
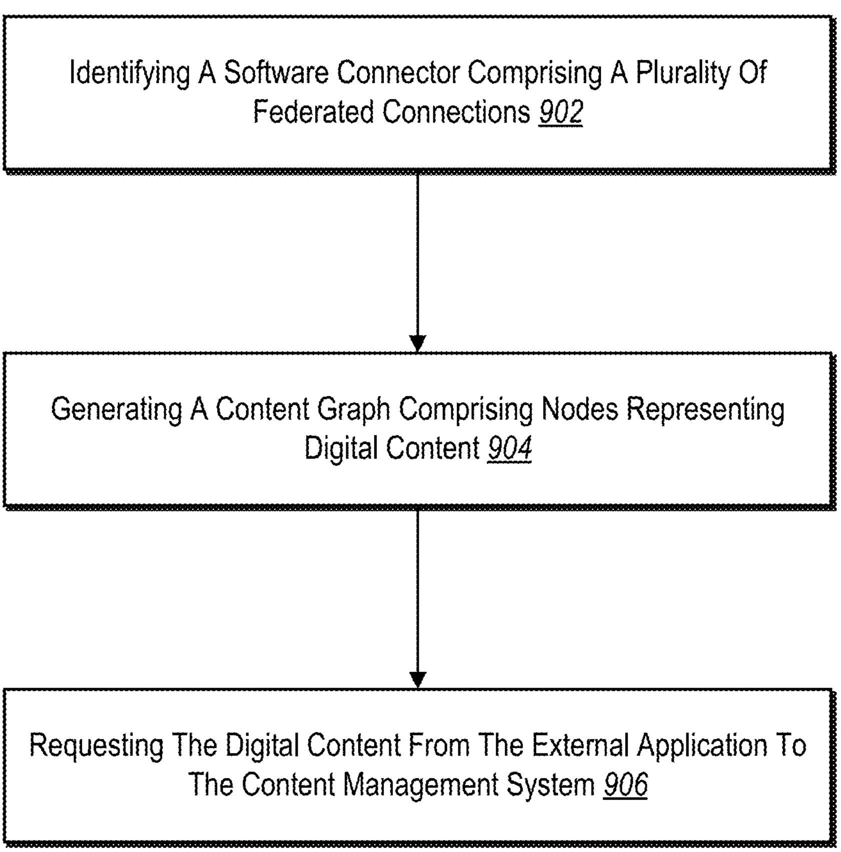

While FIG. 9 illustrates acts according to certain implementations, alternative implementations may omit, add to, reorder, and/or modify any of the acts shown in FIG. 9. The acts of FIG. 9 can be performed as part of a method. Alternatively, a non-transitory computer readable medium can comprise instructions, that when executed by one or more processors, cause a computing device to perform the acts of FIG. 9. In still further implementations, a system can perform the acts of FIG. 9.

FIG. 9 illustrates a flowchart of a series of acts 900 for requesting digital content from an external application in accordance with one or more embodiments. In particular, the series of acts 900 includes an act 902 of identifying a software connector comprising a plurality of federated connections. For example, the act 902 includes identifying a software connector comprising a plurality of federated connections linking a content management system and an external application outside of the content management system, the plurality of federated connections associated with respective user accounts of the content management system and connecting the respective user accounts to the external application through the plurality of federated connections.

In addition, as illustrated in FIG. 9, the series of acts 900 includes an act 904 of generating a content graph comprising nodes representing digital content. For example, the act 904 involves generating, using a sync engine to crawl the plurality of federated connections associated with the respective user accounts, a content graph comprising nodes representing digital content from the external application to sync with the content management system.

As further illustrated in FIG. 9, the series of acts 900 includes an act 906 of requesting the digital content from the external application to the content management system. In particular, the act 906 involves requesting, by the sync engine using the content graph, the digital content from the external application to the content management system through a federated connection of the plurality of federated connections of the software connector.

In one or more embodiments, the series of acts 900 includes an act of generating the content graph by determining a duplicate digital content item associated with a first federated connection of the plurality of federated connections and a second federated connection of the plurality of federated connections. In addition, the series of acts 900 includes an act of generating the content graph comprising a node representing the duplicate digital content item by syncing the duplicate digital content item associated with the first federated connection and ignoring the duplicate digital content item associated with the second federated connection.

In certain embodiments, the series of acts 900 includes an act of generating the content graph by determining, from public digital content accessible by the federated connection, a first set of nodes for the content graph. In addition, the series of acts 900 includes an act of determining, utilizing the sync engine to crawl the plurality of federated connections, a second set of nodes for the content graph from private digital content accessible by the plurality of federated connections. Furthermore, the series of acts 900 includes an act of generating, from the first set of nodes and the second set of nodes, the content graph comprising nodes associated with the public digital content and the private digital content.

In some cases, the series of acts 900 includes an act of requesting, in response to an input from a first user account associated with a first federated connection of the plurality of federated connections, the digital content from the external application associated with a second user account to the content management system through a second federated connection of the plurality of federated connections in response to determining that the first user account and the second user account are associated with a group within the content management system.

In one or more cases, the series of acts 900 includes an act of generating the content graph by determining that a digital content item is associated with an existing node of the content graph and is accessible through a first federated connection associated with a first user account. Additionally, the series of acts 900 includes an act of generating, for the existing node of the content graph, a mapping between the digital content item and the first user account.

In some embodiments, the series of acts 900 includes an act of generating the content graph by determining that a new digital content item from the external application is accessible through a third federated connection associated with a third user account. Additionally, the series of acts 900 includes an act of generating, within the content graph, a new node associated with the new digital content item. Further, the series of acts 900 includes an act of generating, for the new node within the content graph, a mapping between the new node and the third user account indicating the new digital content item is accessible by the third user account.

In various cases, the series of acts 900 includes an act of receiving an indication that: the software connector does not have access to a digital content item of the digital content from the external application or a second federated connection of the plurality of federated connections associated with the digital content item of the digital content does not exist. Additionally, the series of acts 900 includes an act of removing, in response to the indication, a mapping of a node associated with the digital content item to the federated connection from the content graph.

In one or more embodiments, the series of acts 900 includes an act of identifying a software connector comprising a plurality of federated connections linking a content management system and an external application outside of the content management system, the plurality of federated connections associated with respective user accounts of the content management system and connecting the respective user accounts to the external application through the plurality of federated connections. Additionally, the series of acts 900 includes an act of generating, using a sync engine to crawl the plurality of federated connections associated with the respective user accounts, a content graph comprising nodes representing digital content from the external application to sync with the content management system by comparing digital content accessible by the respective user accounts associated with the plurality of federated connections. Further, the series of acts 900 includes an act of requesting, by the sync engine using the content graph, the digital content from the external application to the content management system through a federated connection of the plurality of federated connections of the software connector.

In one or more embodiments, the series of acts 900 includes an act of generating the content graph by determining that the digital content from the external application includes a conversation channel. Additionally, the series of acts 900 includes an act of generating the content graph comprising the digital content including the conversation channel, the content graph comprising one or more mappings indicating the conversation channel is accessible by one or more user accounts of the content management system.

In various cases, the series of acts 900 includes an act of requesting the digital content from the external application by identifying a hierarchical token system that includes an admin token with a set of permissions and a user token having a subset of the set of permissions. In addition, the series of acts 900 includes an act of utilizing a second federated connection of the plurality of federated connections associated with the user token to access a private digital content item through the admin token.

In some embodiments, the series of acts 900 includes an act of generating the content graph by determining a first set of nodes for the content graph from digital content accessible by the federated connection. Additionally, the series of acts 900 includes an act of determining, utilizing the sync engine to crawl the plurality of federated connections, a second set of nodes for the content graph from digital content accessible by the plurality of federated connections. Further, the series of acts 900 includes an act of determining, by comparing the first set of nodes and the second set of nodes, a final set of nodes comprising the first set of nodes and a subset of the second set of nodes. Moreover, the series of acts 900 includes an act of generating, according to the final set of nodes, the content graph comprising nodes associated with the digital content accessible by the plurality of federated connections.

In one or more cases, the series of acts 900 includes an act of generating the content graph by determining that a digital content item is associated with an existing node of the content graph and is accessible through a first federated connection associated with a first user account. Additionally, the series of acts 900 includes an act of generating, for the existing node of the content graph, a mapping between the digital content item and the first user account.

In some embodiments, the series of acts 900 includes an act of receiving an indication that the software connector does not have access to a digital content item of the digital content from the external application. Additionally, the series of acts 900 includes an act of removing a mapping of a node associated with the digital content item to a second federated connection of the plurality of federated connections from the content graph.

In one or more cases, the series of acts 900 includes an act of receiving an indication that a second federated connection of the plurality of federated connections associated with a digital content item of the digital content does not exist. In addition, the series of acts 900 includes an act of removing a mapping of a node associated with the digital content item to the federated connection from the content graph.

In some embodiments, the series of acts 900 includes an act of generating the content graph by determining, using the sync engine, a set of nodes corresponding to digital content items associated with a first federated connection of the plurality of federated connections. Additionally, the series of acts 900 includes an act of determining that a digital content item associated with a second federated connection of the plurality of federated connections is a duplicate digital content item accessible by the first federated connection and the second federated connection. Further, the series of acts 900 includes an act of generating the content graph by mapping the second federated connection to a node representing the duplicate digital content item of the set of nodes corresponding to the digital content items associated with the first federated connection.

In one or more embodiments, the series of acts 900 includes an act of generating, in response to a sync trigger indicating modification of one or more federated connections of the plurality of federated connections and based on the content graph, an updated content graph by using the sync engine to re-crawl the plurality of federated connections associated with the respective user accounts.

In these or other embodiments, the series of acts 900 includes an act of identifying a software connector comprising a plurality of federated connections associated with respective user accounts, the plurality of federated connections linking a content management system and an external application outside of the content management system. Additionally, the series of acts 900 includes an act of generating, using a sync engine to crawl the plurality of federated connections, a content graph comprising nodes representing a plurality of digital content items from the external application to sync with the content management system and further comprising a mapping indicating accessibility of the plurality of digital content items by the plurality of federated connections. Moreover, the series of acts 900 includes an act of requesting, by the sync engine using the content graph including the mapping, a digital content item of the plurality of digital content items from the external application to the content management system through a federated connection of the plurality of federated connections of the software connector.

In various cases, the series of acts 900 includes an act of generating the content graph by determining a new digital content item by comparing a first plurality of digital content items accessible by a first federated connection to a second plurality of digital content items accessible by a second federated connection, the new digital content item present in the second plurality of digital content items and absent from the first plurality of digital content items. Additionally, the series of acts 900 includes an act of generating the content graph by generating a new node associated with the new digital content item.

In some embodiments, the series of acts 900 includes an act of generating the content graph by determining a first set of nodes for the content graph from public digital content accessible by a tenant connection of the software connector, the plurality of federated connections being child connections of the tenant connection. Additionally, the series of acts 900 includes an act of determining, utilizing the sync engine to crawl the plurality of federated connections, a second set of nodes for the content graph from private digital content accessible by the plurality of federated connections. Further, the series of acts 900 includes an act of determining, by comparing the first set of nodes and the second set of nodes, a final set of nodes comprising the first set of nodes and a subset of the second set of nodes. In addition, the series of acts 900 includes an act of generating, according to the final set of nodes, the content graph comprising nodes associated with the private digital content and the public digital content.

In one or more cases, the series of acts 900 includes an act of receiving an indication that a federated connection of the plurality of federated connections does not have access to the digital content item of the plurality of digital content items from the external application. Additionally, the series of acts 900 includes an act of removing a mapping of a node associated with the digital content item to the federated connection from the content graph.

The components of the federated connection system 100 can include software, hardware, or both. For example, the components of the federated connection system 100 can include one or more instructions stored on a computer-readable storage medium and executable by processors of one or more computing devices. When executed by one or more processors, the computer-executable instructions of the federated connection system 100 can cause a computing device to perform the methods described herein. Alternatively, the components of the federated connection system 100 can comprise hardware, such as a special purpose processing device to perform a certain function or group of functions. Additionally, or alternatively, the components of the federated connection system 100 can include a combination of computer-executable instructions and hardware.

Furthermore, the components of the federated connection system 100 performing the functions described herein may, for example, be implemented as part of a stand-alone application, as a module of an application, as a plug-in for applications including content management applications, as a library function or functions that may be called by other applications, and/or as a cloud-computing model. Thus, the components of the federated connection system 100 may be implemented as part of a stand-alone application on a personal computing device or a mobile device.

Embodiments of the present disclosure may comprise or utilize a special purpose or general-purpose computer including computer hardware, such as, for example, one or more processors and system memory, as discussed in greater detail below. Implementations within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, implementations of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some implementations, computer-executable instructions are executed on a general-purpose computer to turn the general-purpose computer into a special purpose computer implementing elements of the disclosure. The computer executable instructions may be, for example, binaries, intermediate format instructions such as assembly language, or even source code.

Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multiprocessor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Implementations of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 10:
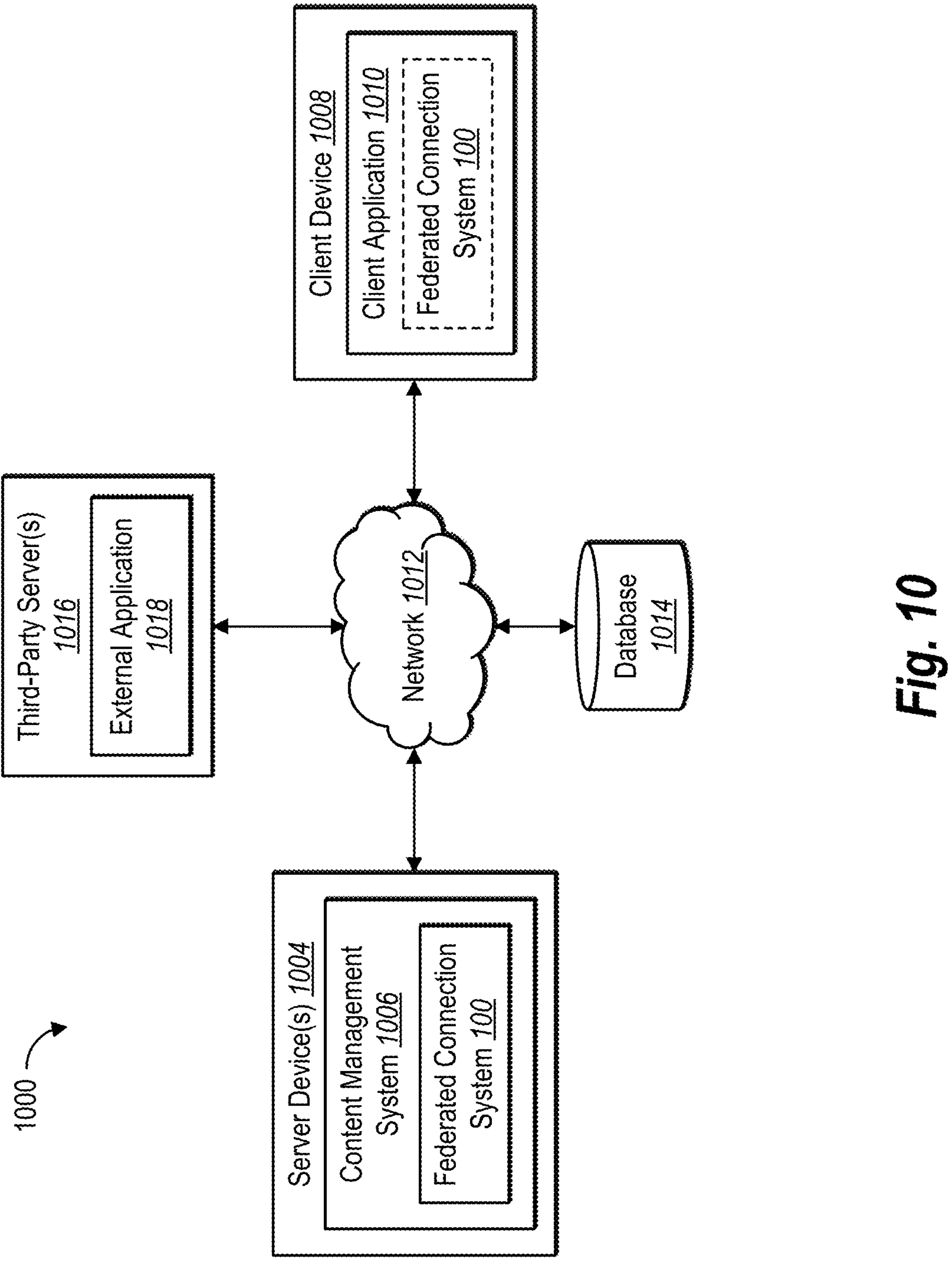
FIG. 10 illustrates a schematic diagram of an example environment of a federated connection system in accordance with one or more embodiments.

Additional detail regarding the federated connection system will now be provided with reference to the figures. For example, FIG. 10 illustrates a schematic diagram of an example system environment for implementing a federated connection system 100 in accordance with one or more implementations.

As shown, the environment 1000 includes server device(s) 1004, client device 1008, database 1014, third-party server(s) 1016, and external application 1018. Each of the components of the environment can communicate via network 1012, and network 1012 may be any suitable network over which computing devices can communicate. Example networks are discussed in more detail below in relation to FIG. 11.

As mentioned above, the environment 1000 includes client device 1008. The client device 1008 can be one of a variety of computing devices, including a smartphone, a tablet, a smart television, a desktop computer, a laptop computer, a virtual reality device, an augmented reality device, or another computing device as described in relation to FIG. 11. The client device 1008 can communicate with the server device(s) 1004 via network 1012. For example, the client device 1008 can receive user input from a user interacting with the client device 1008 (e.g., via the client application 1010) to, for instance, select interface elements to interact with a content management system or to select options that initiate execution of a task. In addition, the federated connection system 100 or the server device(s) 1004 can receive information relating to various interactions with content items and/or user interface elements based on the input received by the client device 1008.

As shown, the client device 1008 can include a client application 1010. In particular, the client application 1010 may be a web application, a native application installed on the client device 1008 (e.g., a mobile application, a desktop application, etc.), or a cloud-based application where all or part of the functionality is performed by the server device(s) 1004. Based on instructions from the client application 1010, the client device 1008 can present or display information, including a user interface for interacting with (or collaborating regarding) initiating tasks. Using the client application, the client device 1008 can perform (or request to perform) various operations, such as executing a task and/or inputting text comprising actions or prompts to generate a specific output.

As illustrated in FIG. 10, the environment 1000 also includes the server device(s) 1004. The server device(s) 1004 may generate, track, store, process, receive, and transmit electronic data, such as results, actions, determinations, responses, computer code, interactions with interface elements, and/or interactions between user accounts or client devices. For example, the server device(s) 1004 may receive an indication from the client device 1008 of a user interaction selecting an option that indicates selection of a tool type or input indicating a tool behavior of the LLM tool. In addition, the server device(s) 1004 can transmit data to the client device 1008. Indeed, the server device(s) 1004 can communicate with the client device 1008 to send and/or receive data via network 1012. In some implementations, the server device(s) 1004 comprise(s) a distributed server where the server device(s) 1004 include(s) a number of server devices distributed across the network 1012 and located in different physical locations. The server device(s) 1004 can comprise one or more content servers, application servers, container orchestration servers, communication servers, web-hosting servers, machine-learning servers, and other types of servers.

As shown in FIG. 10, the server device(s) 1004 can also include the federated connection system 100 as part of the content management system 1006. The content management system 1006 can communicate with the client device 1008 to perform various functions associated with the client application 1010, such as managing user accounts, initiating tasks, and/or identifying content items. Indeed, content management system 1006 can include a network-based smart cloud storage system to manage, store, and maintain content items and related data across numerous user accounts. In some embodiments, the federated connection system 100 and/or the content management system 1006 utilize the database 1014 to store and access information such as a content graph including nodes representing digital content items of the external application 1018 and mappings between nodes and federated connections.

As further illustrated in FIG. 10, the environment 1000 includes the third-party server(s) 1016 that host the external application 1018. In particular, the external application 1018 communicates with the server device(s) 1004, the client device 1008, the database 1014, and/or the third-party server(s) 1016 for the federated connection system 100 to request digital content items from the external application 1018 via federated connections associated with user accounts of the content management system 1006. For example, the federated connection system 100 provides software connection including a tenant connection and a plurality of federated connections associated with user accounts of the content management system 1006 to the to the external application 1018 to generate a content graph of digital content items accessible by the software connection.

In some implementations, though not illustrated in FIG. 10, the environment 1000 may have a different arrangement of components and/or may have a different number or set of components altogether. For example, the client device 1008 may communicate directly with the federated connection system 100 and not through network 1012. The environment may also include one or more third-party systems, each corresponding to a different data source. In addition, the environment can include the database 1014 located external to the server device(s) 1004 (e.g., in communication via the network 1012) or located on the server device(s) 1004 and/or on the client device 1008.

Figure 11:
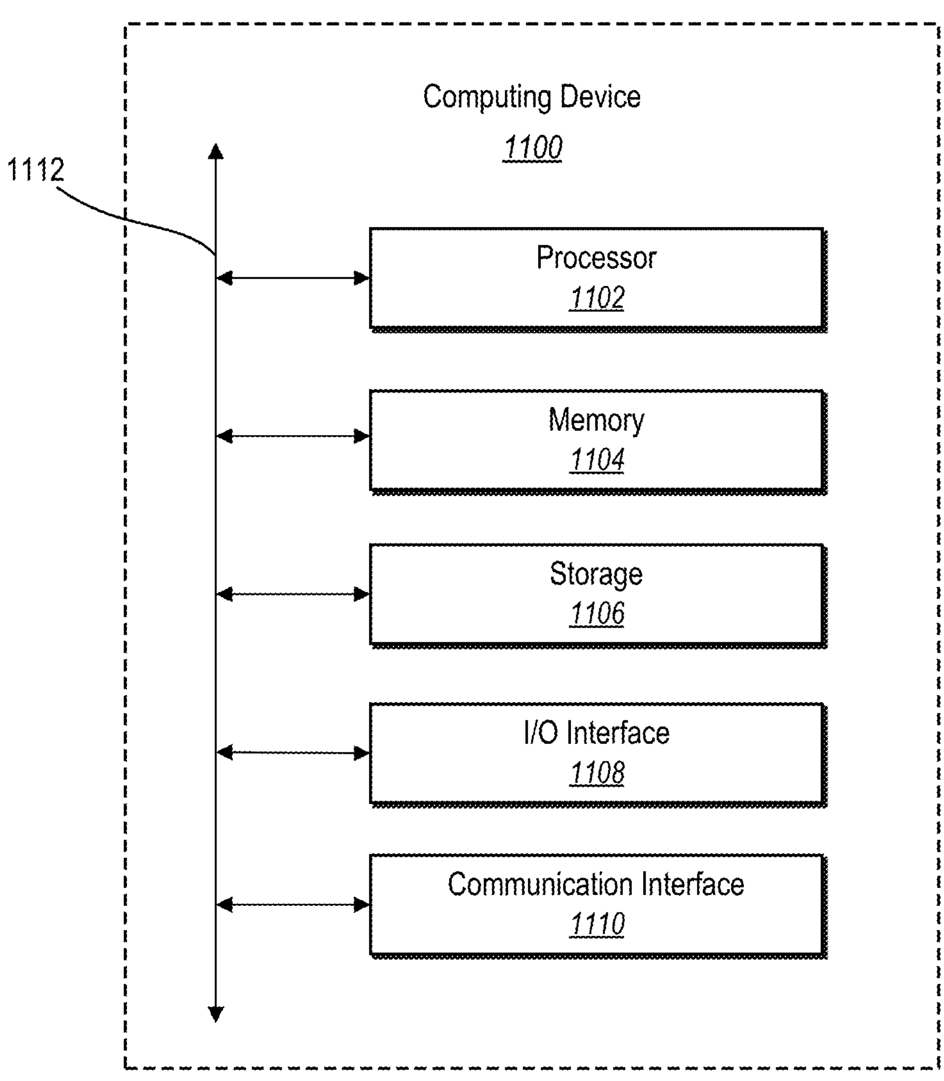
FIG. 11 illustrates a block diagram of an exemplary computing device in accordance with one or more embodiments.

FIG. 11 illustrates a block diagram of exemplary computing device 1100 (e.g., the server device(s) 1004 and/or the client device 1008) that may be configured to perform one or more of the processes described above. One will appreciate that server device(s) 1004 and/or the client device 1008 may comprise one or more computing devices such as computing device 1100. As shown by FIG. 11, computing device 1100 can comprise processor 1102, memory 1104, storage device 1106, I/O interface 1108, and communication interface 1110, which may be communicatively coupled by way of communication infrastructure 1112. While an exemplary computing device 1100 is shown in FIG. 11, the components illustrated in FIG. 11 are not intended to be limiting. Additional or alternative components may be used in other implementations. Furthermore, in certain implementations, computing device 1100 can include fewer components than those shown in FIG. 11. Components of computing device 1100 shown in FIG. 11 will now be described in additional detail.

In particular implementations, processor 1102 includes hardware for executing instructions, such as those making up a computer program. As an example and not by way of limitation, to execute instructions, processor 1102 may retrieve (or fetch) the instructions from an internal register, an internal cache, memory 1104, or storage device 1106 and decode and execute them. In particular implementations, processor 1102 may include one or more internal caches for data, instructions, or addresses. As an example and not by way of limitation, processor 1102 may include one or more instruction caches, one or more data caches, and one or more translation lookaside buffers (TLBs). Instructions in the instruction caches may be copies of instructions in memory 1104 or storage device 1106.

Memory 1104 may be used for storing data, metadata, and programs for execution by the processor(s). Memory 1104 may include one or more of volatile and non-volatile memories, such as Random Access Memory ("RAM"), Read Only Memory ("ROM"), a solid-state disk ("SSD"), Flash, Phase Change Memory ("PCM"), or other types of data storage. Memory 1104 may be internal or distributed memory.

Storage device 1106 includes storage for storing data or instructions. As an example and not by way of limitation, storage device 1106 can comprise a non-transitory storage medium described above. Storage device 1106 may include a hard disk drive (HDD), a floppy disk drive, flash memory, an optical disc, a magneto-optical disc, magnetic tape, or a Universal Serial Bus (USB) drive or a combination of two or more of these. Storage device 1106 may include removable or non-removable (or fixed) media, where appropriate. Storage device 1106 may be internal or external to computing device 1100. In particular implementations, storage device 1106 is non-volatile, solid-state memory. In other implementations, Storage device 1106 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory or a combination of two or more of these.

I/O interface 1108 allows a user to provide input to, receive output from, and otherwise transfer data to and receive data from computing device 1100. I/O interface 1108 may include a mouse, a keypad or a keyboard, a touch screen, a camera, an optical scanner, network interface, modem, other known I/O devices or a combination of such I/O interfaces. I/O interface 1108 may include one or more devices for presenting output to a user, including, but not limited to, a graphics engine, a display (e.g., a display screen), one or more output drivers (e.g., display drivers), one or more audio speakers, and one or more audio drivers. In certain implementations, I/O interface 1108 is configured to provide graphical data to a display for presentation to a user. The graphical data may be representative of one or more graphical user interfaces and/or any other graphical content as may serve a particular implementation.

Communication interface 1110 can include hardware, software, or both. In any event, communication interface 1110 can provide one or more interfaces for communication (such as, for example, packet-based communication) between computing device 1100 and one or more other computing devices or networks. As an example and not by way of limitation, communication interface 1110 may include a network interface controller (NIC) or network adapter for communicating with an Ethernet or other wire-based network or a wireless NIC (WNIC) or wireless adapter for communicating with a wireless network, such as a WI-FI.

Additionally, or alternatively, communication interface 1110 may facilitate communications with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, communication interface 1110 may facilitate communications with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination thereof.

Additionally, communication interface 1110 may facilitate communications various communication protocols. Examples of communication protocols that may be used include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, Long Term Evolution ("LTE") technologies, wireless communication technologies, in-band and out-of-band signaling technologies, and other suitable communications networks and technologies.

Communication infrastructure 1112 may include hardware, software, or both that couples components of computing device 1100 to each other. As an example and not by way of limitation, communication infrastructure 1112 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

Figure 12:
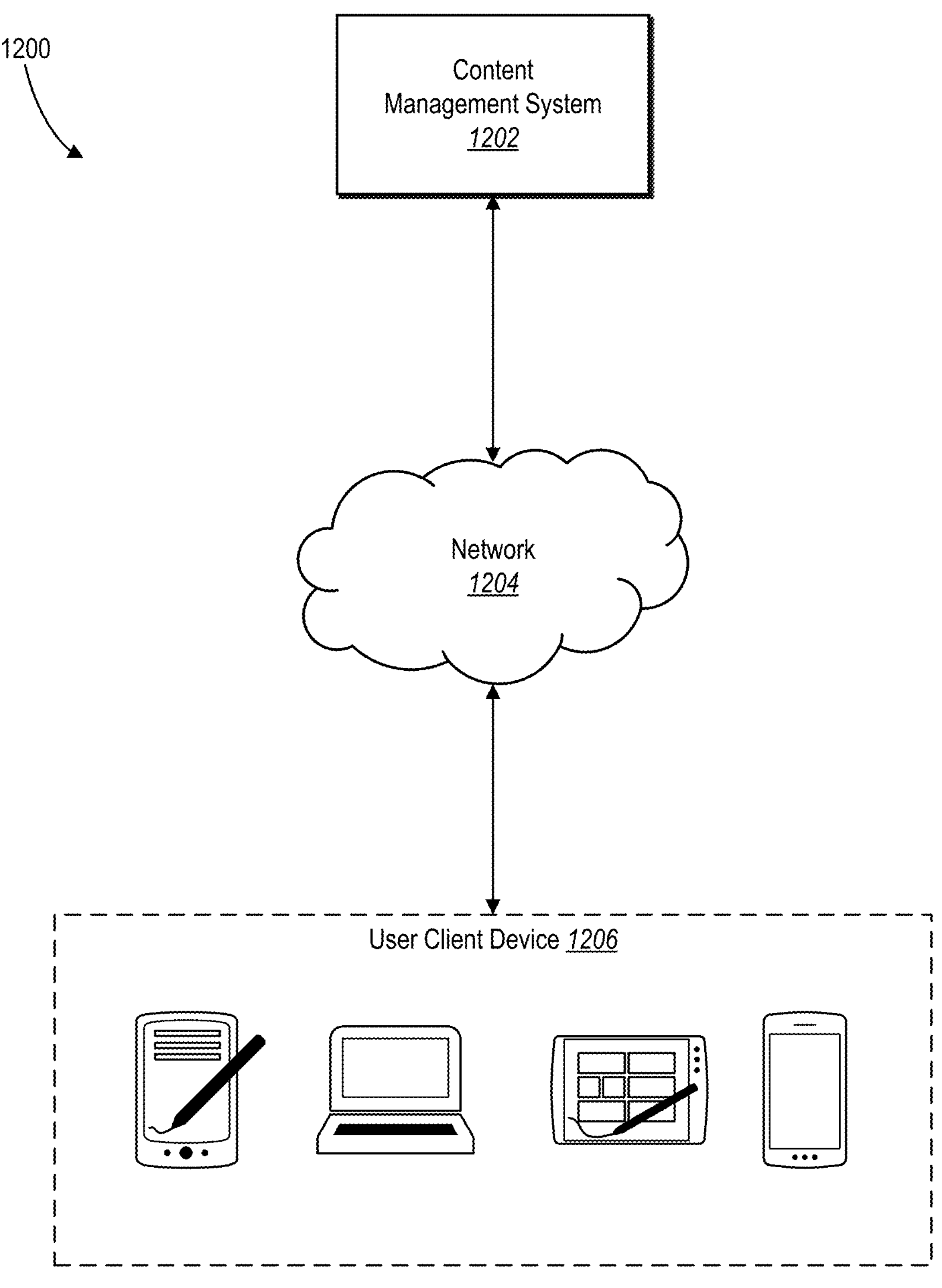
FIG. 12 illustrates an example environment of a networking system having the federated connection system in accordance with one or more embodiments.

FIG. 12 is a schematic diagram illustrating environment 1200 within which one or more implementations of the federated connection system 100 can be implemented. For example, the federated connection system 100 may be part of a content management system 1202 (e.g., the content management system 1006). Content management system 1202 may generate, store, manage, receive, and send digital content (such as digital content items). For example, content management system 1202 may send and receive digital content to and from client devices 1206 by way of network 1204. In particular, content management system 1202 can store and manage a collection of digital content. Content management system 1202 can manage the sharing of digital content between computing devices associated with a plurality of users. For instance, content management system 1202 can facilitate a user sharing a digital content (e.g., a digital content item) with another user of content management system 1202.

In particular, content management system 1202 can manage synchronizing digital content across multiple client devices 1206 associated with one or more users. For example, a user may edit digital content using client device 1206. The content management system 1202 can cause client device 1206 to send the edited digital content to content management system 1202. Content management system 1202 then synchronizes the edited digital content on one or more additional computing devices.

In addition to synchronizing digital content across multiple devices, one or more implementations of content management system 1202 can provide an efficient storage option for users that have large collections of digital content. For example, content management system 1202 can store a collection of digital content on content management system 1202, while the client device 1206 only stores reduced-sized versions of the digital content. A user can navigate and browse the reduced-sized versions (e.g., a thumbnail of a digital image) of the digital content on client device 1206. In particular, one way in which a user can experience digital content is to browse the reduced-sized versions of the digital content on client device 1206.

Another way in which a user can experience digital content is to select a reduced-size version of digital content to request the full- or high-resolution version of digital content from content management system 1202. In particular, upon a user selecting a reduced-sized version of digital content, client device 1206 sends a request to content management system 1202 requesting the digital content associated with the reduced-sized version of the digital content. Content management system 1202 can respond to the request by sending the digital content to client device 1206. Client device 1206, upon receiving the digital content, can then present the digital content to the user. In this way, a user can have access to large collections of digital content while minimizing the amount of resources used on client device 1206.

Client device 1206 may be a desktop computer, a laptop computer, a tablet computer, a personal digital assistant (PDA), an in-or out-of-car navigation system, a handheld device, a smart phone or other cellular or mobile phone, or a mobile gaming device, other mobile device, or other suitable computing devices. Client device 1206 may execute one or more client applications, such as a web browser (e.g., Microsoft Windows Internet Explorer, Mozilla Firefox, Apple Safari, Google Chrome, Opera, etc.) or a native or special-purpose client application (e.g., Dropbox Paper for iPhone or iPad, Dropbox Paper for Android, etc.), to access and view content over network 1204.

Network 1204 may represent a network or collection of networks (such as the Internet, a corporate intranet, a virtual private network (VPN), a local area network (LAN), a wireless local area network (WLAN), a cellular network, a wide area network (WAN), a metropolitan area network (MAN), or a combination of two or more such networks) over which client devices 1206 may access content management system 1202.

In the foregoing specification, the present disclosure has been described with reference to specific exemplary implementations thereof. Various implementations and aspects of the present disclosure(s) are described with reference to details discussed herein, and the accompanying drawings illustrate the various implementations. The description above and drawings are illustrative of the disclosure and are not to be construed as limiting the disclosure. Numerous specific details are described to provide a thorough understanding of various implementations of the present disclosure.

The present disclosure may be embodied in other specific forms without departing from its spirit or essential characteristics. The described implementations are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present application is, therefore, indicated by the appended claims rather than by the foregoing description. All changes that come within the meaning and range of equivalency of the claims are to be embraced within their scope.

The foregoing specification is described with reference to specific exemplary implementations thereof. Various implementations and aspects of the disclosure are described with reference to details discussed herein, and the accompanying drawings illustrate the various implementations. The description above and drawings are illustrative and are not to be construed as limiting. Numerous specific details are described to provide a thorough understanding of various implementations.

The additional or alternative implementations may be embodied in other specific forms without departing from its spirit or essential characteristics. The described implementations are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A computer-implemented method comprising:

identifying a software connector comprising a plurality of federated connections linking a content management system and an external application outside of the content management system, the plurality of federated connections associated with respective user accounts of the content management system and connecting the respective user accounts to the external application according to permissions of the respective user accounts;

generating, using a sync engine to crawl the plurality of federated connections associated with the respective user accounts, a content graph comprising nodes representing digital content from the external application to sync with the content management system;

requesting, by the sync engine using the content graph, the digital content from the external application to the content management system through a federated connection of the plurality of federated connections of the software connector;

receiving an indication that the federated connection of the plurality of federated connections does not have access to a digital content item of the digital content from the external application; and removing, in response to the indication, a mapping of a node associated with the digital content item to the federated connection from the content graph.

2. The computer-implemented method of claim 1, wherein generating the content graph comprises:

determining a duplicate digital content item associated with a first federated connection of the plurality of federated connections and a second federated connection of the plurality of federated connections; and generating the content graph comprising a node representing the duplicate digital content item by syncing the duplicate digital content item associated with the first federated connection and ignoring the duplicate digital content item associated with the second federated connection.

3. The computer-implemented method of claim 1, wherein generating the content graph comprises:

determining, from public digital content accessible by the federated connection, a first set of nodes for the content graph;

determining, utilizing the sync engine to crawl the plurality of federated connections, a second set of nodes for the content graph from private digital content accessible by the plurality of federated connections; and generating, from the first set of nodes and the second set of nodes, the content graph comprising nodes associated with the public digital content and the private digital content.

4. The computer-implemented method of claim 1, further comprising requesting, in response to an input from a first user account associated with a first federated connection of the plurality of federated connections, the digital content from the external application associated with a second user account to the content management system through a second federated connection of the plurality of federated connections in response to determining that the first user account and the second user account are associated with a group within the content management system.

5. The computer-implemented method of claim 1, wherein generating the content graph comprises:

determining that a digital content item is associated with an existing node of the content graph and is accessible through a first federated connection associated with a first user account; and generating, for the existing node of the content graph, a mapping between the digital content item and the first user account.

6. The computer-implemented method of claim 1, wherein generating the content graph comprises:

determining that a new digital content item from the external application is accessible through a third federated connection associated with a third user account;

generating, within the content graph, a new node associated with the new digital content item; and generating, for the new node within the content graph, a mapping between the new node and the third user account indicating the new digital content item is accessible by the third user account.

7. The computer-implemented method of claim 1, further comprising:

receiving an indication that:

the software connector does not have access to a digital content item of the digital content from the external application; or a second federated connection of the plurality of federated connections associated with the digital content item of the digital content does not exist; and removing, in response to the indication, a mapping of a node associated with the digital content item to the federated connection from the content graph.

8. A system comprising:

at least one processor; and a non-transitory computer-readable medium storing instructions which, when executed by the at least one processor, cause the system to:

identify a software connector comprising a plurality of federated connections linking a content management system and an external application outside of the content management system, the plurality of federated connections associated with respective user accounts of the content management system and connecting the respective user accounts to the external application according to permissions of the respective user accounts;

generate, using a sync engine to crawl the plurality of federated connections associated with the respective user accounts, a content graph comprising nodes representing digital content from the external application to sync with the content management system by comparing digital content accessible by the respective user accounts associated with the plurality of federated connections;

request, by the sync engine using the content graph, the digital content from the external application to the content management system through a federated connection of the plurality of federated connections of the software connector;

receive an indication that the federated connection of the plurality of federated connections does not have access to a digital content item of the digital content from the external application; and remove, in response to the indication, a mapping of a node associated with the digital content item to the federated connection from the content graph.

9. The system of claim 8, wherein the instructions further cause the system to generate the content graph by:

determining that the digital content from the external application includes a conversation channel; and generating the content graph comprising the digital content including the conversation channel, the content graph comprising one or more mappings indicating the conversation channel is accessible by one or more user accounts of the content management system.

10. The system of claim 8, wherein the instructions further cause the system to request the digital content from the external application by:

identifying a hierarchical token system that includes an admin token with a set of permissions and a user token having a subset of the set of permissions; and utilizing a second federated connection of the plurality of federated connections associated with the user token to access a private digital content item through the admin token.

11. The system of claim 8, wherein the instructions further cause the system to generate the content graph by:

determining a first set of nodes for the content graph from digital content accessible by a tenant connection of the software connector, the plurality of federated connections being child connections of the tenant connection;

determining, utilizing the sync engine to crawl the plurality of federated connections, a second set of nodes for the content graph from digital content accessible by the plurality of federated connections;

determining, by comparing the first set of nodes and the second set of nodes, a final set of nodes comprising the first set of nodes and a subset of the second set of nodes; and generating, according to the final set of nodes, the content graph comprising nodes associated with the digital content accessible by the tenant connection and the plurality of federated connections.

12. The system of claim 8, wherein the instructions further cause the system to generate the content graph by:

determining that a digital content item is associated with an existing node of the content graph and is accessible through a first federated connection associated with a first user account; and generating, for the existing node of the content graph, a mapping between the digital content item and the first user account.

13. The system of claim 8, wherein the instructions further cause the system to:

receive the indication that the software connector does not have access to the digital content item of the digital content from the external application; and remove a mapping of a node associated with the digital content item to a second federated connection of the plurality of federated connections from the content graph.

14. The system of claim 8, wherein the instructions further cause the system to:

receive an indication that a second federated connection of the plurality of federated connections associated with a digital content item of the digital content does not exist; and remove the mapping of a node associated with the digital content item to the federated connection from the content graph.

15. The system of claim 8, wherein the instructions further cause the system to generate the content graph by:

determining, using the sync engine, a set of nodes corresponding to digital content items associated with a first federated connection of the plurality of federated connections;

determining that a digital content item associated with a second federated connection of the plurality of federated connections is a duplicate digital content item accessible by the first federated connection and the second federated connection; and generating the content graph by mapping the second federated connection to a node representing the duplicate digital content item of the set of nodes corresponding to the digital content items associated with the first federated connection.

16. The system of claim 8, further comprising generating, in response to a sync trigger indicating modification of one or more federated connections of the plurality of federated connections and based on the content graph, an updated content graph by using the sync engine to re-crawl the plurality of federated connections associated with the respective user accounts.

17. A non-transitory computer-readable medium storing executable instructions which, when executed by at least one processor, cause the at least one processor to:

identify a software connector comprising a plurality of federated connections associated with respective user accounts, the plurality of federated connections linking a content management system and an external application outside of the content management system, the plurality of federated connections associated with the respective user accounts of the content management system and connecting the respective user accounts to the external application according to permissions of the respective user accounts;

generate, using a sync engine to crawl the plurality of federated connections, a content graph comprising nodes representing digital content items from the external application to sync with the content management system and further comprising a mapping indicating accessibility of the digital content items by the plurality of federated connections;

request, by the sync engine using the content graph including the mapping, a digital content item of the digital content items from the external application to the content management system through a federated connection of the plurality of federated connections of the software connector;

receive an indication that the federated connection of the plurality of federated connections does not have access to the digital content item of the digital content items from the external application; and remove, in response to the indication, the mapping of a node associated with the digital content item to the federated connection from the content graph.

18. The non-transitory computer-readable medium of claim 17, wherein generating the content graph comprises:

determining a new digital content item by comparing a first plurality of digital content items accessible by a first federated connection to a second plurality of digital content items accessible by a second federated connection, the new digital content item present in the second plurality of digital content items and absent from the first plurality of digital content items; and generating the content graph by generating a new node associated with the new digital content item.

19. The non-transitory computer-readable medium of claim 17, wherein generating the content graph comprises:

determining a first set of nodes for the content graph from public digital content accessible by the federated connection;

determining, utilizing the sync engine to crawl the plurality of federated connections, a second set of nodes for the content graph from private digital content accessible by the plurality of federated connections;

determining, by comparing the first set of nodes and the second set of nodes, a final set of nodes comprising the first set of nodes and a subset of the second set of nodes; and generating, according to the final set of nodes, the content graph comprising nodes associated with the private digital content and the public digital content.

20. The non-transitory computer-readable medium of claim 17, further comprising:

receiving an indication that:

the federated connection of the plurality of federated connections does not have access to the digital content item of the digital content items from the external application; or a second federated connection of the plurality of federated connections associated with the digital content item of the digital content items does not exist; and removing the mapping of a node associated with the digital content item to the federated connection from the content graph.

* * * * *